United States Patent [19]
Smith

[11] Patent Number: 5,526,963
[45] Date of Patent: Jun. 18, 1996

[54] HAND-HELD GRAVITY FEED SPRAY BOTTLE

[76] Inventor: Gerald K. Smith, P.O. Box 2141, Morgan Hill, Calif. 95038

[21] Appl. No.: 382,928

[22] Filed: Feb. 2, 1995

[51] Int. Cl.$^6$ .................................................. G01F 11/04
[52] U.S. Cl. ........................................ 222/321.8; 222/324
[58] Field of Search ......................... 222/321.4, 321.7, 222/321.8, 383.1, 323, 324, 372, 376, 377, 470; 239/333, 345

[56] References Cited

U.S. PATENT DOCUMENTS

| | | | |
|---|---|---|---|
| 1,986,343 | 1/1935 | Iskyan | 222/324 |
| 2,825,334 | 3/1956 | Kas, Sr. | 222/470 X |
| 3,104,448 | 9/1963 | Morrow et al. | 222/79 X |
| 3,237,809 | 3/1966 | Daragan et al. | 222/323 X |
| 3,701,478 | 10/1972 | Tada | 239/333 |
| 3,797,749 | 3/1974 | Tada | 239/333 X |
| 3,827,601 | 8/1974 | Magrath et al. | 222/324 X |
| 4,411,387 | 10/1983 | Stern et al. | 239/345 |
| 4,456,152 | 6/1984 | Young et al. | 222/372 X |
| 4,678,122 | 7/1987 | Riglietti | 239/333 X |
| 4,713,257 | 12/1987 | Luttermoller | 239/300 X |
| 4,993,639 | 2/1991 | Hata | 239/345 X |
| 5,188,295 | 2/1993 | Stern et al. | 239/345 X |

*Primary Examiner*—Kevin P. Shaver
*Attorney, Agent, or Firm*—Keith Kline

[57] ABSTRACT

A hand-held gravity feed spray bottle. The liquid reservoir which supplies the spray mechanism is situated so that it is above the spray and pump mechanism when held by a user. The reservoir is affixed so that its longitudinal axis is at an angle to that of the spray mechanism. The pump mechanism is a standard hand pump with a plunger reciprocating in a chamber. The reservoir includes a liquid feed tube and a pressure equalization tube. One-way check valves in each of these tubes ensures that there is no leakage from the reservoir.

3 Claims, 2 Drawing Sheets

3,526,963

HAND-HELD GRAVITY FEED SPRAY BOTTLE

FIELD OF THE INVENTION

The present invention relates generally to spray mechanism, and more particularly is a hand-held spray bottle with the liquid reservoir situated above the spray mechanism.

BACKGROUND OF THE INVENTION

Pump spray bottles are used to dispense a wide variety of products. Their ability to supply a fine mist without the use of an aerosol propellant has increased the value of these devices in the age of ecological awareness. However, there is presently no commercially available spray bottle that allows a user to spray a fluid downward with minimal fluid remaining in the reservoir.

Because of their great economic value, there have been many patents addressed to the construction of spray bottles. Stern et al., in U.S. Pat. No. 4,411,387, "MANUALLY-OPERATED SPRAY APPLICATOR", discloses one such device. A later Stern et al. effort, U.S. Pat. No. 5,188,295, discloses a similar device with the reservoir attached at a 45° to the spray mechanism. This innovation has been found through experimentation by the present inventor to improve the flow of a liquid through a spray device.

Another device directed to spray bottles is the "MIST SPRAYER", U.S. Pat. No. 4,993,639, by Hata, which incorporates a blower device to achieve the spray delivery.

The devices mentioned above all embody a shortcoming of the prior art, that being that two hands are required to operate the device. The Stern et al. device require the use of two hands by the construction of the devices. One hand must be utilized to hold the delivery area of the device, while the other hand is used to pump the liquid. Hata has a single mechanism to trigger delivery of the liquid, but because of the long lever created by the sprayer mechanism of Hata, the user's second hand must be used to support the liquid reservoir.

Hata also illustrates another shortcoming of the prior art in that when in the spraying position, there is no way to stop the liquid flow. Thus the bottle would drip continuously when held by a user.

The dripping is overcome by using a bottle with the liquid reservoir situated above the spray mechanism. However, that arrangement leads to another shortcoming of some prior art devices, the lack of immediate fluid flow when the device is pumped. When the liquid reservoir is beneath the pump mechanism, the first few strokes of the hand pump will be required to raise the liquid to the spray nozzle, and will not actually deliver any liquid.

OBJECTS, SUMMARY, AND ADVANTAGES OF THE INVENTION

It is therefore an object of the present invention to provide a device that allows the liquid reservoir to be situated above the spray mechanism without leakage of the liquid.

It is a further object of the present invention to provide a device that can be easily and comfortably operated with one hand.

It is a still further object of the present invention to provide a device that supplies a liquid flow immediately open activation by the user.

In summary, the present invention is a hand-held gravity feed spray bottle. The liquid reservoir which supplies the spray mechanism is situated so that it is above the spray and pump mechanism when held by a user. The reservoir is affixed so that its longitudinal axis is at an approximately 30°–45° angle to that of the spray mechanism. The pump mechanism is a standard hand pump with a plunger reciprocating in a chamber. The reservoir includes a liquid feed tube and a pressure equalization tube. One-way check valves in each of these tubes ensures that there is no leakage from the reservoir.

An advantage of the present invention is that it can be operated with only one hand.

Another advantage of the present invention is that because of the position of the liquid reservoir, liquid is supplied immediately when the user activates the hand pump.

A further advantage of the present invention is that the system of check valves eliminates leakage from the liquid reservoir.

A still further advantage of the present invention is that it is simple and inexpensive to manufacture.

These and other objects and advantages of the present invention will become apparent to those skilled in the art in view of the description of the best presently known mode of carrying out the invention as described herein and as illustrated in the drawings.

BEST MODE OF CARRYING OUT THE INVENTION

Figure 1:
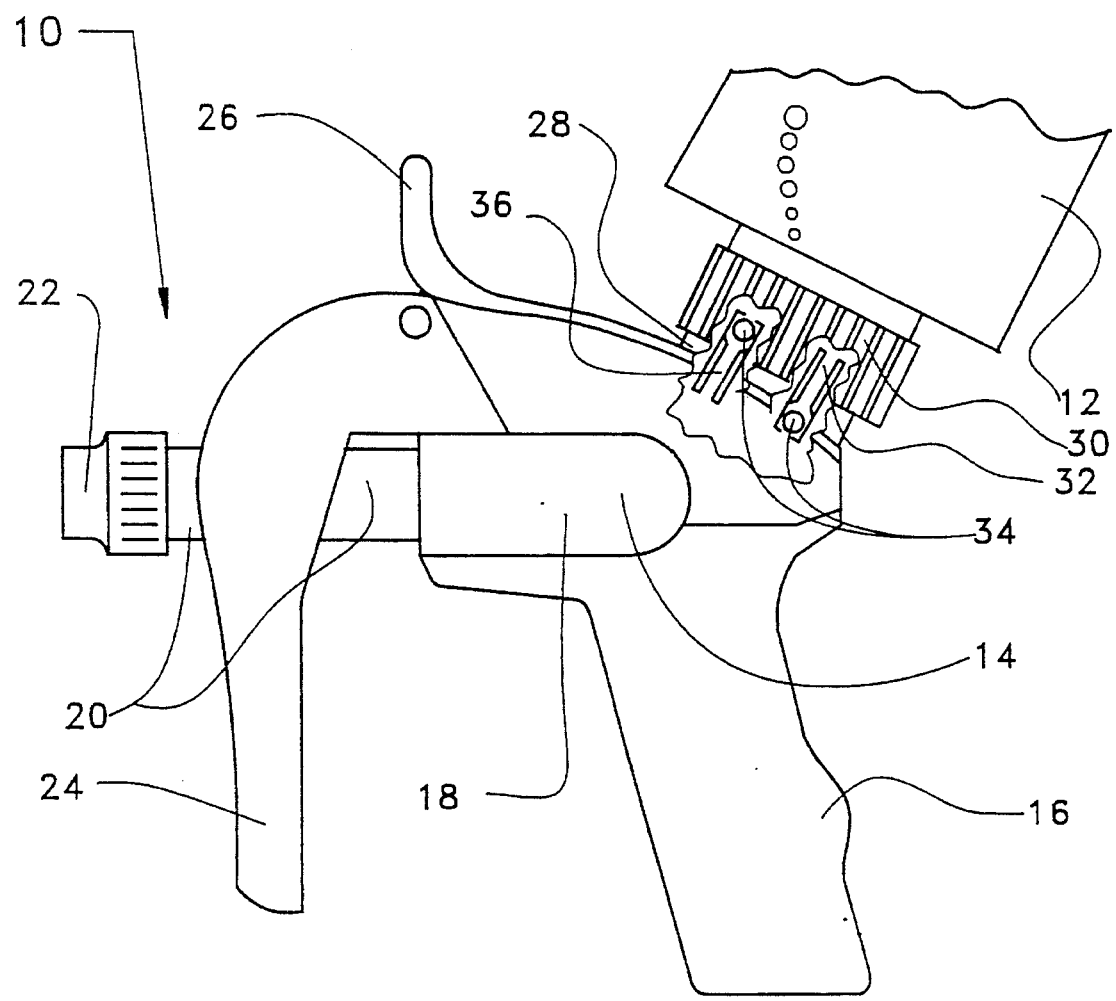
FIG. 1 is a side view of the hand-held spray bottle of the present invention.
Figure 2:
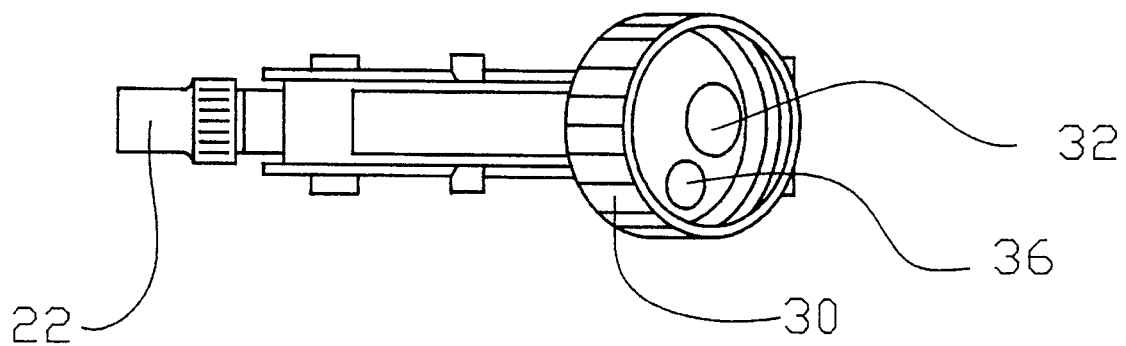
FIG. 2 is a top view of the spray/pump mechanism.
Figure 3:
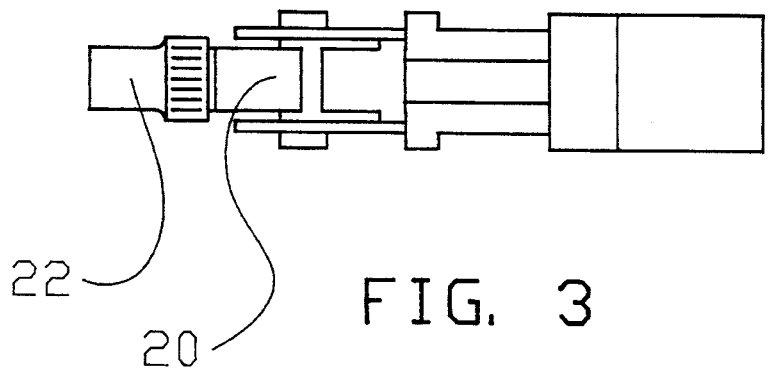
FIG. 3 is a bottom view of the spray/pump mechanism.
Figure 4:
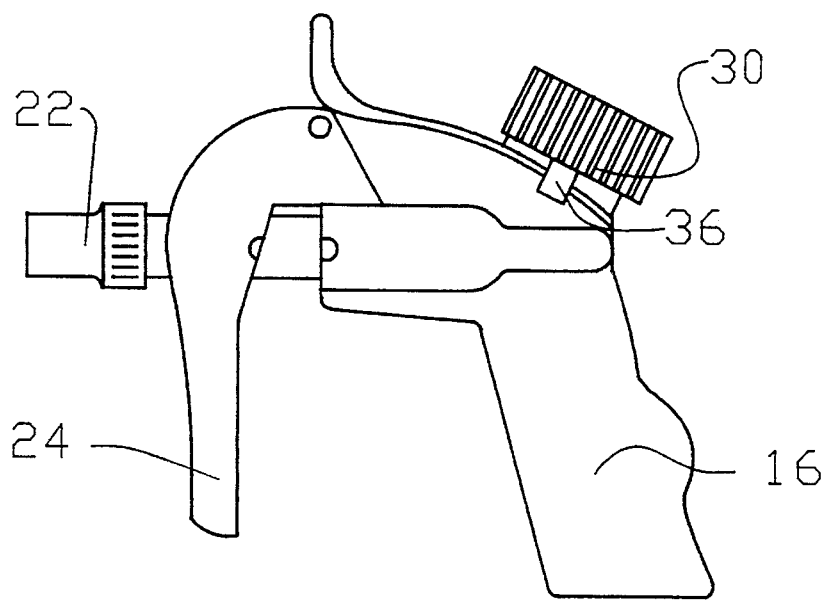
FIG. 4 is a side view of the spray/pump mechanism.

The present invention is a hand-held gravity feed spray bottle 10. The device comprises chiefly a liquid reservoir 12 which is affixed to a spray/pump mechanism 14. The spray/pump mechanism 14 includes a grip portion 16 with a chamber 18 in a central portion of an upper area thereof.

The chamber 18 receives a reciprocating plunger 20. A spray nozzle 22 is affixed to an exterior end of the plunger 20. The plunger 20 is driven by a trigger 24 which is hingedly affixed to both the plunger 20 and the top of the upper area of the grip 16. (It should be recognized that there is a central throughway extending through the plunger 20 to accommodate the flow of liquid.)

A securing hook is supplied at the top of the upper area of the grip 16. The hook is used to store the bottle 10 in any convenient place within the user's reach, such as a belt, pocket, or work cart.

The reservoir 12 is mounted on the upper portion of the grip 16 by means of a receiving fixture 28. While any means of water tight securing of the reservoir is acceptable, in the preferred embodiment, a threaded cap element 30 receives a threaded mouth of the reservoir 12.

A liquid feed tube 32 allows the flow of liquid from the reservoir 12 to the chamber 18. A one-way check valve 34 in the liquid feed tube 32 ensures that no liquid leaks out of the reservoir 12, and that pressure is maintained during pumping. A pressure equalization tube 36 allows ambient air to enter the reservoir 12, thereby eliminating vaccuum in the reservoir 12. Another check valve 34 in the air inlet tube ensures that no leakage will occur from the air inlet tube 36.

Operation of the spray bottle 10 is generally as follows: a user will select a bottle 10 whose reservoir 12 is filled with the desired liquid. The bottle 10 will most often be hung (inverted) from the hook 26. The user holds the device by the grip 16 so that the bottle reservoir 12 is above the spray/pump mechanism 14. It has been discovered through experimentation that optimum flow occurs if the longitudinal axis of the reservoir forms a 30° to 45° angle with a line normal to the centerline of the plunger 20 and the chamber 18.

The user activates the spray/pump mechanism 14 by pulling the trigger 24. This forces the plunger 20 into the chamber 18 and begins the pumping process. The check valve 34 in the feed tube 32 is forced open as the plunger retracts. The force of gravity ensures that liquid in the reservoir 12 will have been brought up to the check valve 34 of the feed tube 32, so that the first pull of the trigger 24 will force liquid out through the nozzle 22. Air is drawn into the reservoir 12 through the inlet tube 36 to counterbalance the vacuum formed by the evacuation of liquid.

While nearly any rigid material will suffice for the construction of the present invention, it is envisioned that the preferred embodiment will be formed from molded plastic.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

I claim:

1. A hand-held spray bottle comprising:

a reservoir to hold a liquid desired to be sprayed by a user, said reservoir including a pressure equalization tube sealed by a one-way check valve, said reservoir further including a liquid feed tube sealed by a second one-way check valve;

a grip including a reservoir receiving fixture on a top side thereof;

a spraying and pumping mechanism; wherein said spraying and pumping mechanism includes a hollow chamber in communication with said reservoir via said feed tube with said one-way check valve therein, said spraying and pumping mechanism further including a plunger actuated by a trigger, said plunger including a spray nozzle on a first end thereof; and wherein said reservoir is mounted onto said grip by means of said receiving fixture, said mounting being accomplished so that the longitudinal centerline of the plunger and the chamber forms an acute angle with a longitudinal centerline of the reservoir so as to enhance fluid flow from the reservoir to the chamber;

said spraying and pumping mechanism being actuated by the user squeezing the trigger, thereby forcing the plunger into the chamber and creating a pumping action, drawing liquid from the reservoir, through the chamber, through the plunger, and out through the spray nozzle to a target area selected by said user.

2. The spray bottle of claim 1 wherein:

the angle between the longitudinal centerline of the liquid reservoir and the longitudinal centerline of the plunger and the chamber is between 30° and 45°.

3. The spray bottle of claim 1 wherein: said grip includes a hook on a top portion thereof.

* * * * *